United States Patent
Antus, Jr.

(10) Patent No.: US 8,196,882 B2
(45) Date of Patent: Jun. 12, 2012

(54) MOVABLE POLE SUPPORT

(76) Inventor: Edwin J. Antus, Jr., San Diego, CA (US)

( * ) Notice: Subject to any disclaimer, the term of this patent is extended or adjusted under 35 U.S.C. 154(b) by 0 days.

(21) Appl. No.: 12/938,356

(22) Filed: Nov. 2, 2010

(65) Prior Publication Data

US 2011/0101186 A1    May 5, 2011

Related U.S. Application Data

(60) Provisional application No. 61/280,343, filed on Nov. 2, 2009.

(51) Int. Cl.
*A47B 96/00* (2006.01)
(52) U.S. Cl. .............. 248/231.71; 135/16; 248/534
(58) Field of Classification Search .............. 248/511, 248/534, 538, 540, 222.14, 229.15, 229.23, 248/228.6, 231.71; 135/16, 161
See application file for complete search history.

(56) References Cited

U.S. PATENT DOCUMENTS

| | | | |
|---|---|---|---|
| 2,322,107 A * | 6/1943 | Balcar ..................... | 269/224 |
| 6,109,571 A * | 8/2000 | Hirschovits et al. ........ | 248/118 |
| 7,201,442 B1 * | 4/2007 | Decosta, Jr. ............. | 297/184.16 |
| 8,132,767 B2 * | 3/2012 | Oh et al. ................. | 248/214 |
| 2006/0043662 A1 * | 3/2006 | Blake, III .................. | 269/249 |
| 2008/0042027 A1 * | 2/2008 | LaScala .................. | 248/229.15 |
| 2009/0078840 A1 * | 3/2009 | Wolvin ................... | 248/229.15 |
| 2010/0288905 A1 * | 11/2010 | Shaffstall et al. ........... | 248/540 |

* cited by examiner

*Primary Examiner* — Ramon Ramirez
(74) *Attorney, Agent, or Firm* — Gary L. Eastman, Esq.

(57) ABSTRACT

A movable pole support includes an upper block and a lower block, each formed with a pole-receiving bore. The blocks are separated by a number of extension posts that maintain the blocks in a parallel position and spaced-apart to define a gap. The gap is sized to accept the edge of a table or counter, and the lower block is equipped with a locking screw that may be threaded into the lower block to secure the movable pole support onto a table or counter. The upper and lower blocks may be formed with a receiving groove shaped to receive a raised table rim, or a lower lip edge. A damage-resistant pad may be provided on any table-contacting surface to avoid damage to the table or counter being used. The movable pole support may also have a pole set screw insertable into the upper block to secure a pole securely within the pole-receiving bore.

9 Claims, 7 Drawing Sheets

MOVABLE POLE SUPPORT

RELATED APPLICATION

This application claims the benefit of priority to U.S. Provisional Patent Application Ser. No. 61/280,343 filed Nov. 2, 2009, entitled "Movable Pole Support" and currently co-pending.

FIELD OF THE INVENTION

The present invention relates generally to patio furniture and outdoor furniture in general. The present invention is more particularly, though not exclusively, useful as a movable pole support for using outdoor pole devices, such as umbrellas, tiki torches, and the like in conjunction with a table or countertop.

BACKGROUND OF THE INVENTION

Picnic tables may be equipped with an overhead umbrella to provide shade to the table. Typically, the table is formed with a hole in its center, and an umbrella pole is inserted through the hole in the center of the table, and may then be secured at the ground using a weighed base. The base, along with pole extending upwards through the hole in the table surface, maintains the umbrella in place directly above the table. While this may provide for suitable shade at noontime when the sun is substantially overhead, it does little to provide shade in the morning or afternoons when the sunlight is striking the table surface at an angle.

To accommodate the change in the position of the sun, some umbrellas are mounted to a pole that includes and articulation joint at its upper end adjacent the umbrella. In use, the upper end of the umbrella pole may be bent to position the umbrella at an angle to the table, and in the direction of the sun's rays. This approach, however, still positions the umbrella substantially above the center of the table and provides little benefit over the non-articulating umbrella poles.

Another approach to providing sunlight protection is to position the umbrella in a heavy base, and position the umbrella and base near a table to provide shade to the table's occupants. Unfortunately, while these bases are very heavy, they nevertheless are prone to falling over in heavy winds, and are very difficult to move as the sun advances through the sky.

In light of the above, it would be advantageous to provide a movable pole support that could be used in conjunction with an umbrella and a table that provides for easy movement of the umbrella to provide optimum shade. It would also be advantageous to provide a movable pole support that is easily installed on a table or bench, and easily relocated to another location along the table or bench as the sun moves through the sky. It would also be advantageous to provide a movable pole support that can be used in conjunction with nearly all tables, benches, and counters, and can be used in conjunction with nearly all umbrellas.

SUMMARY OF THE INVENTION

The movable pole support of the present invention includes an upper block and a lower block, each formed with a pole-receiving bore. The blocks are separated by a number of extension posts that maintain the blocks in a parallel position and spaced-apart to define a gap. The gap is sized to accept the edge of a table or counter, and the lower block is equipped with a locking screw that may be threaded into the lower block to secure the movable pole support onto a table or counter.

The upper and lower blocks may be formed with a receiving groove shaped to receive a raised table rim, or a lower lip edge. A damage-resistant pad may be provided on any table-contacting surface to avoid damage to the table or counter being used. The movable pole support may also have a pole set screw insertable into the upper block to secure a pole securely within the pole-receiving bore.

In an alternative embodiment, the upper and lower blocks can be integrally formed into a unibody having an upper arm for placement on the upper surface of the table, and a lower arm that is equipped with a threaded insert to receive a threaded post that may be threaded inwards to securely contact the lower surface of the table.

DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION OF THE INVENTION

Figure 1:
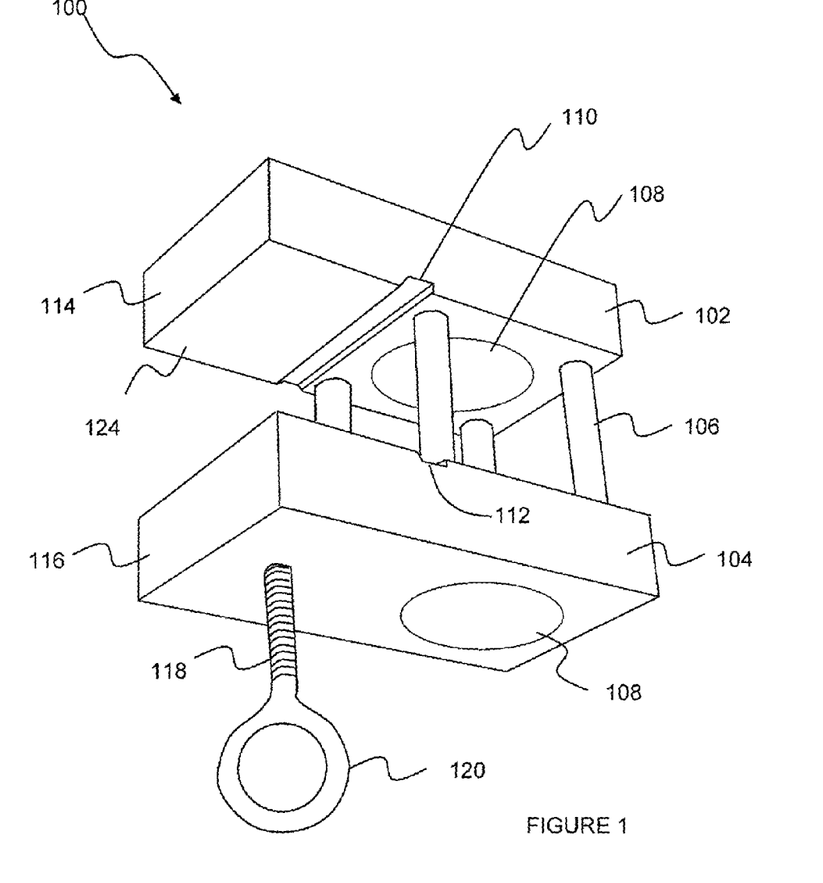
FIG. 1 is a lower perspective view of the movable pole support of the present invention showing the upper block and the lower block separated by the extension posts, and each formed with a pole-receiving bore, and showing the locking screw to securely attach the device to a table or bench.

Referring initially to FIG. 1, a lower perspective view of the movable pole support of the present invention is shown and generally designated 100. Device 100 includes an upper block 102 and a lower block 104 separated by extension posts 106. As can be seen from this Figure, there are four extension posts, however, it is to be appreciated that this is merely an example of a preferred embodiment. Extension posts may have other cross-sectional shapes, and there can be more or less of them so long as the upper block 102 and lower block 104 are maintained in a substantially parallel relationship to each other.

The upper block 102 and lower block 104 are each formed with a pole-receiving bore 108. The specific size of this bore may vary to accommodate umbrella poles having different diameters. Also, as will be discussed below in greater detail, a pole set screw may be provided to secure the pole in place, or inserts may be provided to receive different sized poles.

Upper block 102 and lower block 104 are each formed with a receiving groove 110 and 112 shaped to receive a raised table rim, or a lower lip edge. This allows the distal ends 114 and 116 of upper block 102 to sit securely on the upper surface of a table or counter even if the table is formed with a perimeter rim or edge.

Locking screw 118 is threaded into lower block 104 to securely attach the device to a table or bench by capturing the table or bench between contact surface 124 of the upper block, and the threaded locking screw 118. A knob 120 may be provided to facilitate hand-turning the threaded locking screw 118.

Figure 2:
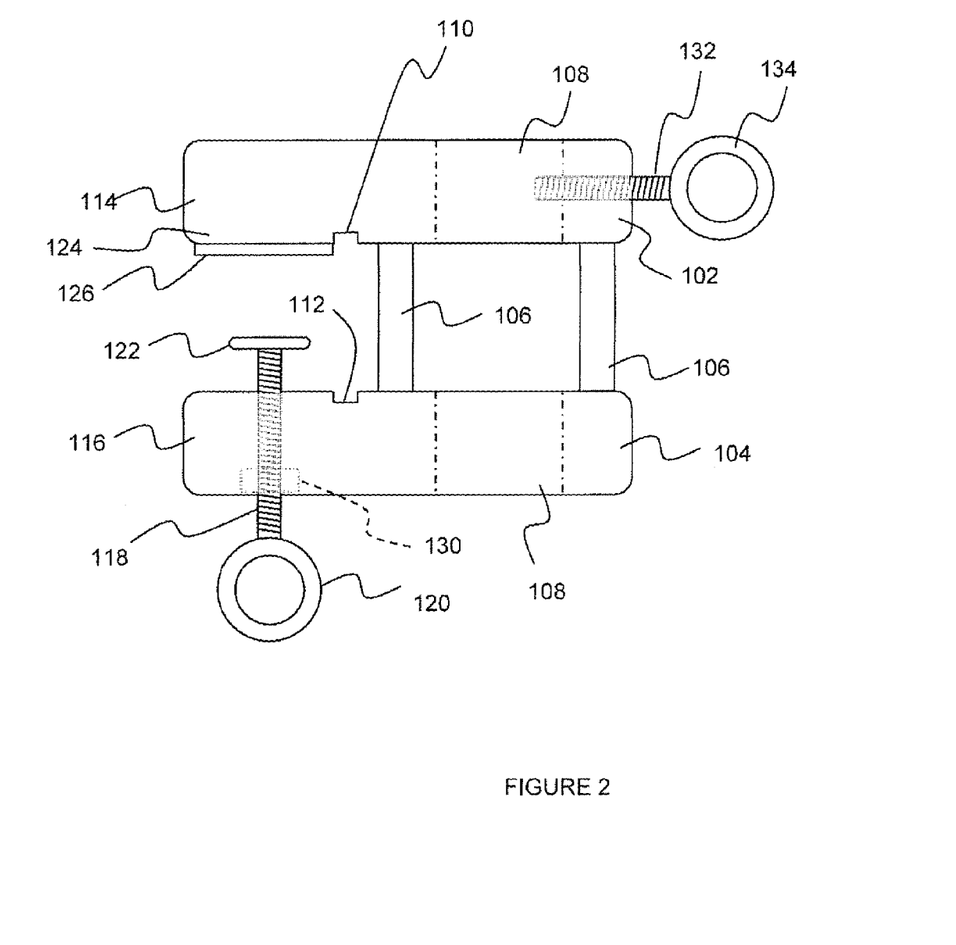
FIG. 2 is a side view of the movable pole support of the present invention showing the upper block and the lower block separated by the extension posts, each formed with a pole-receiving bore, and showing the locking screw to securely attach the device to a table or bench, and showing the damage-resistant pad and contact pad which contact the upper and lower surfaces of a table, and a pole set screw to secure a pole within the device.

Referring now to FIG. 2, a side view of the movable pole support 100 of the present invention shows the upper block 102 and the lower block 104 separated by the extension posts 106. It is to be considered that the spacing between the upper block 102 and the lower block 104 may be varied by utilizing extension posts 106 having different lengths. Thus, by using longer extension posts 106, a thicker counter or table can be accommodated, and by using shorter extension posts 106, a thinner counter or table may be accommodated without having to thread the locking screw 118 as far as possible.

Each block 102 and 104 are formed with a pole-receiving bore 108 (shown in dashed lines). As can be appreciated, the diameter of the pole receiving bores 108 may be different to accommodate umbrella poles having different diameters. Further, a pole set screw 132 with a grip 134 may thread into bore 108 to secure a pole (not shown this Figure) within the bores 108.

Locking screw 118 securely attaches the device 100 to a table or bench. In order to provide additional strength to the device, a threaded nut 130 may be embedded or formed into the lower block 104. As shown in this Figure, nut 130 provides threaded insert into block 104 so that when handle 120 is rotated, the locking screw 118 advances through nut 130 and block 104.

A contact pad 122 may be positioned on the end of locking screw 118 to provide a distributed contact area to the underside of the table or counter, and to minimize slippage on or deformation to the contact surface. Also, a damage resistant pad 126 may be formed in or attached to contact surface 124 the distal end 114 of upper block 102. The contact pad 126 provides a non-slip surface, and also minimizes any scratching or damage to the table surface.

Figure 3:
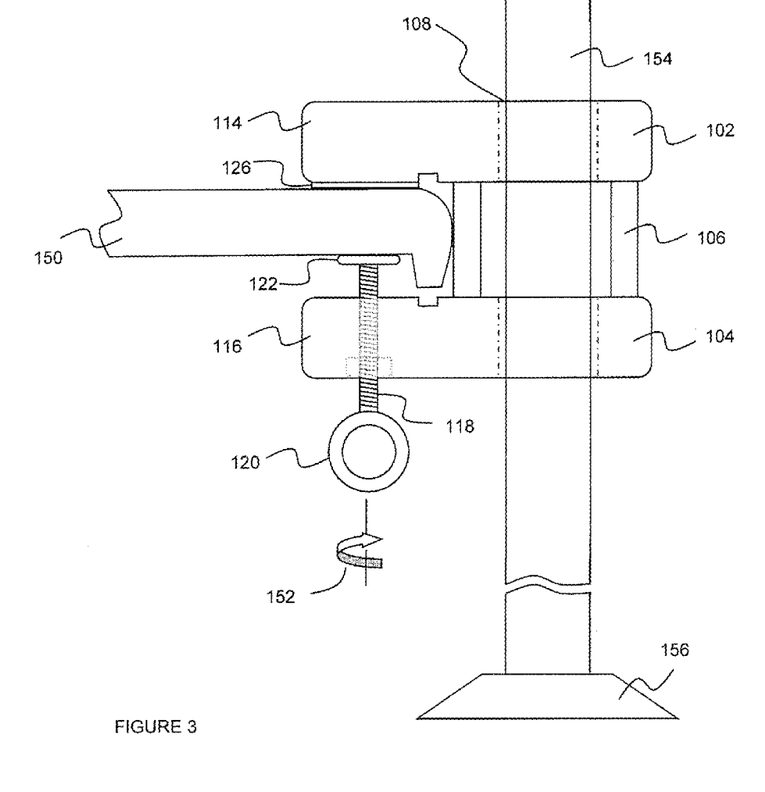
FIG. 3 is a side view of the movable pole support of the present invention removable attached to a table, and showing the upper block and the lower block separated by the extension posts, each formed with a pole-receiving bore supporting a pole, and showing the locking screw threaded upwards to securely attach the device to a table or bench, and showing the damage-resistant pad and contact pad which contact the upper and lower surfaces of a table, and the lower end of the umbrella pole in a base.

Referring now to FIG. 3, a side view of the movable pole support 100 of the present invention is shown attached to a table 150. In this Figure, the upper block 102 and the lower block 104 are separated by the extension posts 106. In use, the device 100 is positioned over the edge of a table 150 so that damage resistant pad 126 sits flatly on the upper surface of the table 150. Locking screw 118 is rotated in direction 152 until contact pad 122 securely contacts the underside of the table 150, and tightened.

Each pole-receiving bore 108 supports a portion of a pole 154, which is inserted through the device 100 and into a base 156 located on the ground. Once in position, the pole set screw 132 (not shown this Figure) may be tightened to secure the pole within device 100. Instead of base 156, the pole 154 may be equipped with a cap which protects the end of the pole 154 and prevents the ground surfaces from being marred by the pole end.

Figure 4:
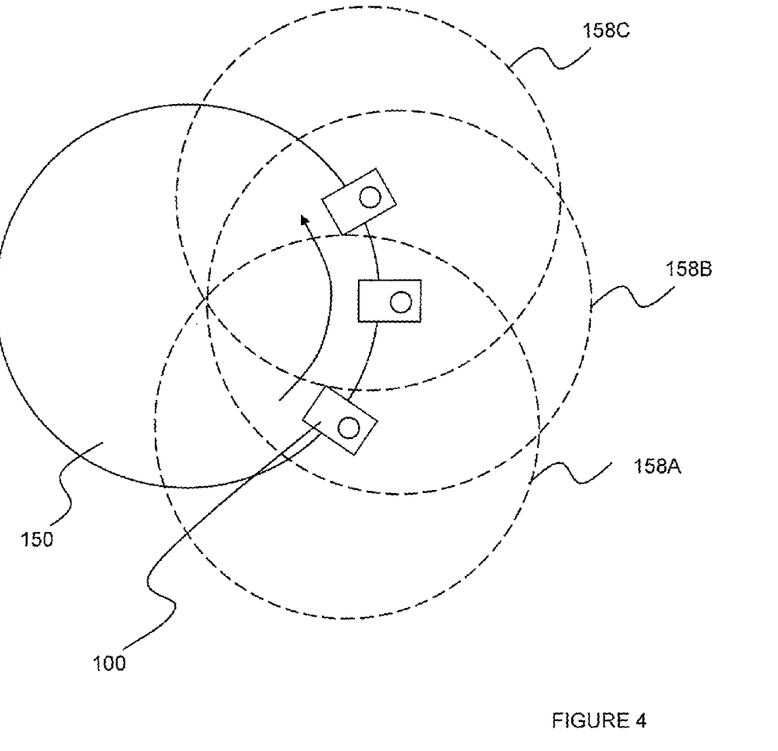
FIG. 4 is a top plan view of the movable pole support of the present invention as used in conjunction with a standard circular picnic table and depicting the movement of the present invention around the perimeter of the table to accommodate the moving sun to provide shade to the table.

In use as shown in FIG. 4, the movable pole support 100 of the present invention, is used in conjunction with a standard circular picnic table 150. Initially, the device 100 is fitted with an umbrella in an initial position 158A. Then, as the sun advances throughout the day, the shade will naturally drift from the table surface exposing the table's occupants to the sun. By simply loosening the locking screw 118, the device and umbrella are advanced along the edge of the table 150 to position 158B where the table is once again in the shade, and the locking screw 118 is then tightened. This can be done again and again as shown by position 158O, and repeated as necessary to accommodate the moving sun.

Figure 5:
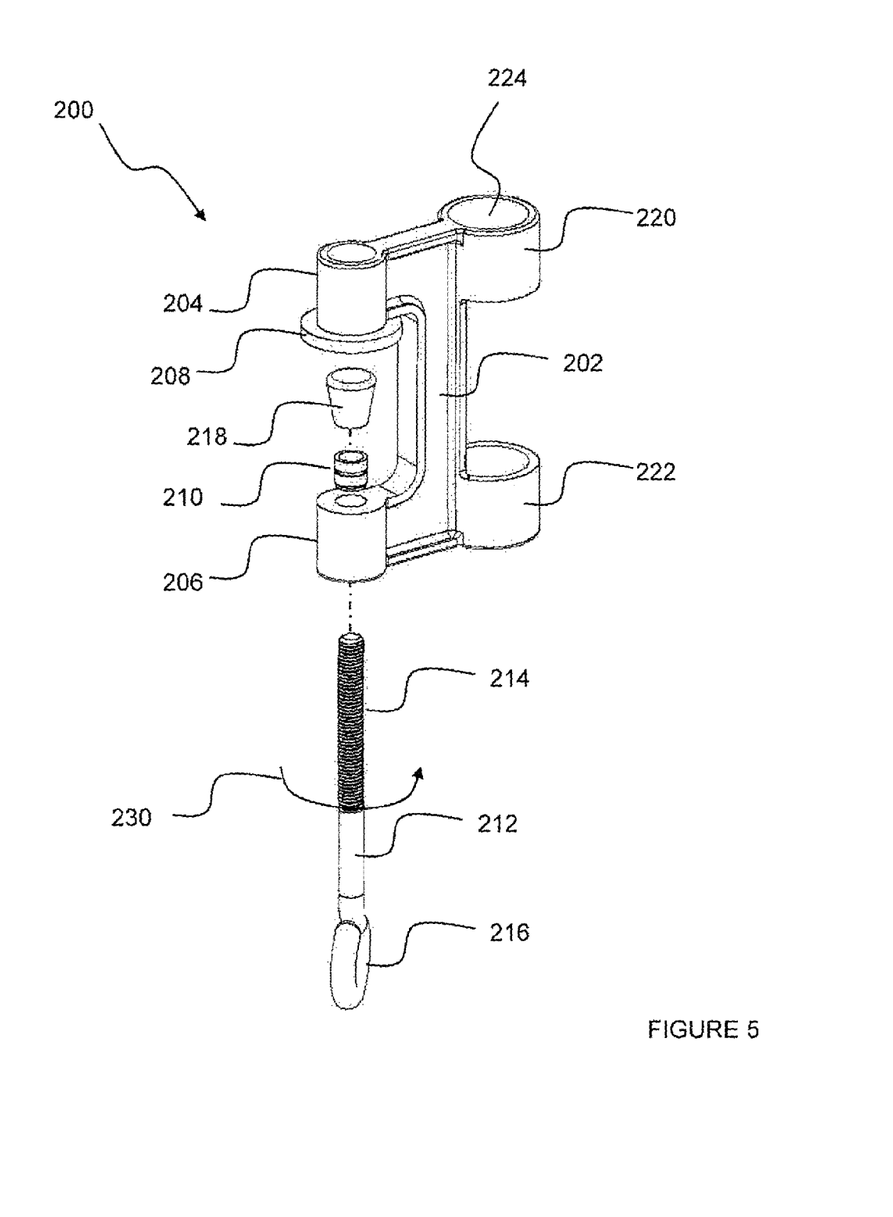
FIG. 5 is an exploded perspective view of an alternative embodiment of the movable pole support of the present invention showing a unibody construction formed with an upper arm, a lower arm having a threaded insert to receive a threaded bolt, and a pair of pole support rings sized to receive an umbrella pole.

Referring now to FIG. 5, an exploded perspective view of an alternative embodiment of the movable pole support of the present invention is shown and generally designated 200. Device 200 includes a unibody 202 formed with an upper arm 204 and a lower arm 206. A table pad 208 is formed on the underside of upper arm 204 to provide a contact surface for the table top surface. In a preferred embodiment, the table pad 208 may be formed from a rubberized material, or may be equipped with a non-skid material to resist movement of the device 200 once mounted to a table.

Lower arm 206 is formed to receive a threaded insert 210 that receives a threaded bolt 212 having threaded portion 214, and may be capped with a skid-resistant cap 218. Cap 218, in a preferred embodiment, is made from a rubberized material that prevents slippage on the underside of the table once the threaded bolt 212 is tightened against the table (not shown this Figure).

Unibody 202 is formed with a pair of pole support rings 220 and 222 that define a vertical axis and are sized to receive an umbrella pole (not shown this Figure). From this Figure, it is to be appreciated that any number of pole support rings may be incorporated herein without departing from the spirit of the present invention.

In use, the unibody 202 is positioned so that the table pad 208 of the upper arm 204 is placed flatly on the upper surface of a tabletop. Once in position, the threaded bolt is rotated in direction 230 to advance the cap towards the underside of the table thereby capturing the table between the pad 208 and the cap 218 securing the unibody 202 in place on the table.

Figure 6:
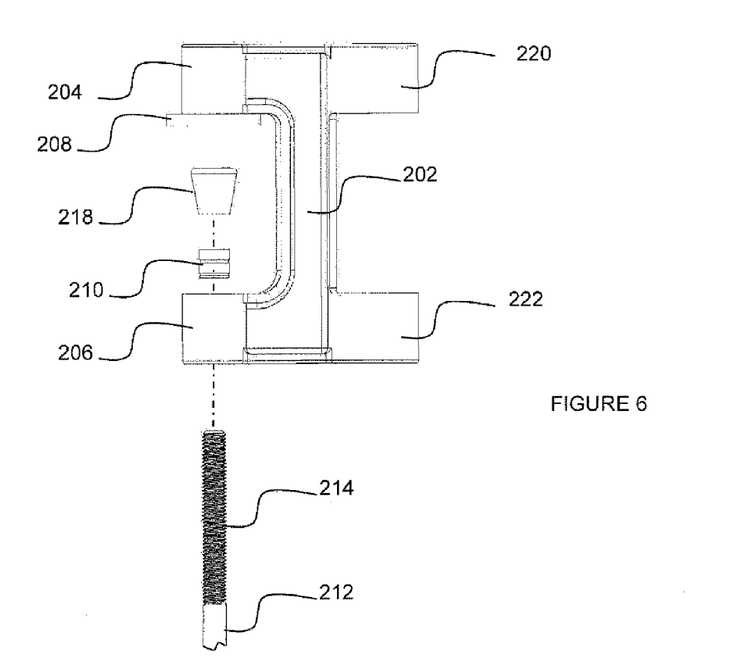
FIG. 6 is a side exploded view an alternative embodiment of the movable pole support of the present invention showing the unibody construction formed with an upper arm, a lower arm having a threaded insert to receive a threaded bolt, and a pair of pole support rings sized to receive an umbrella pole.

From the side exploded view in FIG. 6, the movable pole support 200 of the present invention shows the unibody 202 formed with the upper arm 204, the lower arm 206, and the threaded insert 210 to receive threaded bolt 212. Pole support rings 220 and 222 are shown to be of the same size, and positioned co-axially to receive an umbrella pole (not shown this Figure).

Figure 7:
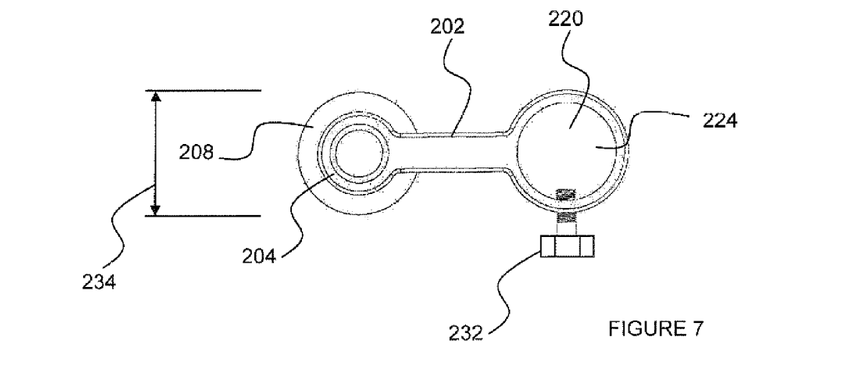
FIG. 7 is a top plan view of the movable pole support of FIGS. 5 and 6, showing the pole-support ring and the unibody formed with the integral table pad for gripping the upper surface of the table (not shown this Figure)

FIG. 7 is a top plan view of the movable pole support 200, showing the pole-support ring 220 defining a bore 224. Bore 224 may be equipped with a set-screw 232 to secure an umbrella pole within the bore 224. Also from this Figure, the unibody 202 is shown formed with the substantially flat integral table pad 208 for gripping the upper surface of a table (not shown this Figure). It is also to be appreciated that the diameter 234 can vary on design, and can extend several inches on either side of the unibody 202. In fact, in some applications of the present invention the size of the pad 208 may greatly exceed the size of upper arm 204 so as to provide increased resistance to tipping and lateral movement of the unibody 202 umbrella relative to the table top surface.

Figure 8:
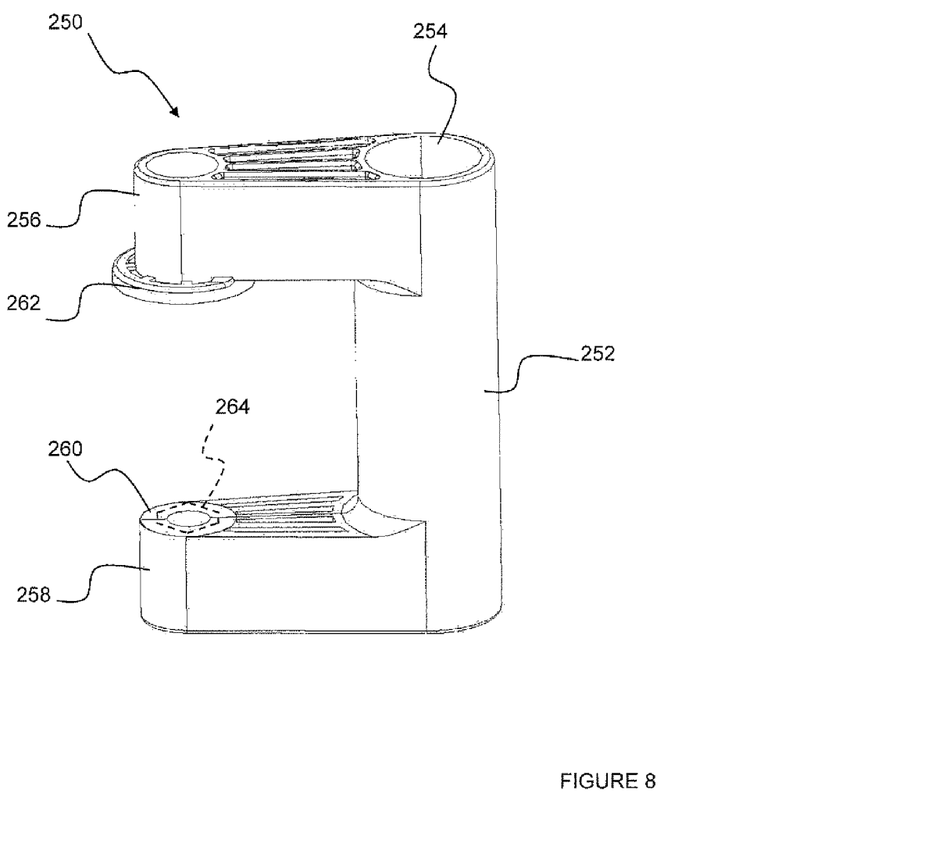
FIG. 8 is a perspective view of an alternative embodiment of the movable pole support of the present invention showing a unibody construction formed with an upper arm, a lower arm having a threaded insert to receive a threaded bolt, and a pole support bore through the unibody to receive an umbrella pole.

Referring now to FIG. 8, a perspective view of an alternative embodiment of the movable pole support of the present invention is shown and generally designated 250. Device 250 includes a unibody 252 formed with an upper arm, a lower arm having a threaded insert to receive a threaded bolt, a pole support bore 254 through the unibody 252 to receive an umbrella pole. Extending from unibody 252 is an upper arm 256 and a lower arm 258. Upper arm 256 is formed with a table pad 262, lower arm 258 is formed with a threaded insert 260. From this view it is to be appreciated that the threaded insert 260 may be circular shaped as shown in conjunction with unibody 202, or may include a traditional threaded nut 264 (shown in dashed lines). Specifically, a nut 264 may be positioned into the lower arm 258 such that the threaded bolt 121 can be threaded through the nut. When tightened, the outward force will urge nut 264 into lower arm 258 to secure the nut in place. Alternatively, lower arm 258 may be threaded to receive threaded bolt 212.

As shown herein, the various embodiments of the movable pole support of the present invention may be made from various plastics that provide rigidity and durability, high-strength rubbers, wood, and all forms of metal, without departing from the spirit of the present invention. Indeed, the present invention may be made from any material known in the art that provides the durability and strength required to securely yet movably mount an umbrella to a table or other horizontal surface.

While there have been shown what are presently considered to be preferred embodiments of the present invention, it will be apparent to those skilled in the art that various changes and modifications can be made herein without departing from the scope and spirit of the invention.

I claim:

1. A movable pole support, comprising:
    a unibody formed with an upper arm formed with a table pad, and a lower arm;
    a threaded insert received in said lower arm;
    a threaded bolt having a threaded portion in said threaded insert;
    said arms defining a first vertical axis;
    a skid resistant cap positionable on said threaded portion of said threaded bolt; and
    a pair of pole support rings formed in said unibody defining a second vertical axis parallel to said first vertical axis.

2. The movable pole support of claim 1, further comprising:
    a table pad made from a rubberized material.

3. The movable pole support of claim 1, further comprising:
    a table pad made from skid resistant material.

4. The movable pole support of claim 1, further comprising:
    one or more additional pole support rings formed in said unibody between said upper arm and said lower arm further defining said second vertical axis.

5. The movable pole support of claim 1, further comprising:
    a threaded hole perpendicular to said second vertical axis in one or more of said pole support rings; and
    one or more threaded screws having a threaded portion in said threaded holes.

6. The movable pole support of claim 1, further comprising:
    said unibody made from rigid and durable plastic.

7. The movable pole support of claim 1, further comprising:
    said unibody made from wood.

8. The movable pole support of claim 1, further comprising:
    said unibody made from metal.

9. The movable pole support of claim 1, further comprising:
    a hole in said lower arm along said first vertical axis to receive said threaded bolt wherein said hole is sized larger than said threaded bolt.

* * * * *